US012441885B2

(12) United States Patent
Ogawa

(10) Patent No.: US 12,441,885 B2
(45) Date of Patent: Oct. 14, 2025

(54) PHOTOCURABLE LIQUID SILICONE COMPOSITION, CURED ARTICLE THEREOF, OPTICAL FILLER CONTAINING SAID COMPOSITION, AND DISPLAY DEVICE CONTAINING LAYER COMPRISING CURED ARTICLE THEREOF

(71) Applicant: DOW TORAY CO., LTD., Tokyo (JP)

(72) Inventor: Takuya Ogawa, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 663 days.

(21) Appl. No.: 17/800,212

(22) PCT Filed: Feb. 19, 2021

(86) PCT No.: PCT/JP2021/006285
§ 371 (c)(1),
(2) Date: Oct. 27, 2022

(87) PCT Pub. No.: WO2021/167051
PCT Pub. Date: Aug. 26, 2021

(65) Prior Publication Data
US 2023/0106539 A1 Apr. 6, 2023

(30) Foreign Application Priority Data
Feb. 21, 2020 (JP) .................... 2020-028126

(51) Int. Cl.
| C08L 83/04 | (2006.01) |
| C08G 77/00 | (2006.01) |
| C08G 77/20 | (2006.01) |
| C08J 3/28 | (2006.01) |
| C08K 5/37 | (2006.01) |
| G02B 1/04 | (2006.01) |
| G02B 1/12 | (2006.01) |
| C08G 77/04 | (2006.01) |

(52) U.S. Cl.
CPC .............. *C08L 83/04* (2013.01); *C08G 77/20* (2013.01); *C08G 77/80* (2013.01); *C08J 3/28* (2013.01); *C08K 5/37* (2013.01); *G02B 1/04* (2013.01); *G02B 1/12* (2013.01); *C08G 77/045* (2013.01); *C08L 2205/025* (2013.01)

(58) Field of Classification Search
CPC combination set(s) only.
See application file for complete search history.

(56) References Cited

U.S. PATENT DOCUMENTS

| 4,234,713 | A | 11/1980 | LeGrow |
| 4,359,369 | A | 11/1982 | Takamizawa et al. |
| 4,558,147 | A * | 12/1985 | Eckberg ............... C08G 77/392 556/427 |
| 5,585,035 | A | 12/1996 | Nerad et al. |
| 2007/0025678 | A1 | 2/2007 | Kushibiki et al. |
| 2007/0299165 | A1 | 12/2007 | Haitko et al. |
| 2009/0118440 | A1 | 5/2009 | Nakanishi et al. |
| 2011/0311788 | A1 | 12/2011 | Tagami et al. |
| 2012/0172544 | A1 | 7/2012 | Liang et al. |
| 2013/0065983 | A1 | 3/2013 | Ono et al. |
| 2013/0256741 | A1 | 10/2013 | Harkness et al. |
| 2013/0256742 | A1 | 10/2013 | Harkness et al. |
| 2014/0008697 | A1 | 1/2014 | Harkness et al. |
| 2015/0210905 | A1 | 7/2015 | Hoshino et al. |
| 2017/0342198 | A1 | 11/2017 | Ogawa et al. |
| 2019/0112430 | A1 | 4/2019 | Yook et al. |
| 2019/0196331 | A1 | 6/2019 | Maruyama et al. |
| 2019/0233692 | A1 | 8/2019 | Otomo et al. |
| 2020/0032111 | A1 | 1/2020 | Ogawa et al. |
| 2020/0071580 | A1 | 3/2020 | Ogawa et al. |
| 2024/0191017 | A1 | 6/2024 | Ogawa et al. |

FOREIGN PATENT DOCUMENTS

| CA | 1185734 A | 4/1985 |
| CN | 105315675 A | 2/2016 |
| CN | 110291156 A | 9/2019 |
| CN | 110894361 A | 3/2020 |

(Continued)

OTHER PUBLICATIONS

Machine assisted English translation of CN105315675A obtained from https://worldwide.espacenet.com/patent on Mar. 25, 2024, 27 pages.
English translation of International Search Report for PCT/JP2021/006285 dated Apr. 20, 2021, 2 pages.
Machine assisted English translation of JPH1160953A, obtained from https://patents.google.com/ on Feb. 13, 2023, 6 pgs.
Machine assisted English translation of JP6150415B2 obtained from <https://patents.google.com/patent> on Aug. 20, 2024, 18 pages.
Machine assisted English translation of JP2018184574A obtained from https://patents.google.com/patent on Dec. 4, 2022, 11 pages.
Machine assisted English translation of JP2014205823A obtained from https://patents.google.com/patent on Dec. 4, 2022, 9 pages.

(Continued)

*Primary Examiner* — Marc S Zimmer
(74) *Attorney, Agent, or Firm* — Warner Norcross + Judd LLP

(57) ABSTRACT

A photocurable liquid silicone composition, that has low viscosity that facilitates injection into a small gap, cures quickly by irradiating with a high energy beam (such as ultraviolet light or the like), has a refractive index after curing that is high not only in a visible region but also in an infrared region, and is particularly useful as a material for a device using an infrared LED light source, is provided. The photocurable liquid silicone composition comprises: (A) an organosilane or low molecular weight organosiloxane with one to five silicon atoms and in one molecule, at least two alkenyl groups and at least two monovalent functional groups selected from aromatic groups and aralkyl groups, (C) in one molecule, a compound having at least two mercapto groups, and (D) a photoradical initiator. The refractive index of the entire liquid composition, prior to curing, is 1.48 or higher.

12 Claims, No Drawings

(56) References Cited

FOREIGN PATENT DOCUMENTS

| | | |
|---|---|---|
| EP | 3034535 A1 | 6/2016 |
| JP | H09501511 A | 2/1997 |
| JP | H1160953 A | 3/1999 |
| JP | 2007008996 A | 1/2007 |
| JP | 2007246894 A | 9/2007 |
| JP | 2008303343 A | 12/2008 |
| JP | 2012001668 A | 1/2012 |
| JP | 2012140617 A | 7/2012 |
| JP | 2013139547 A | 7/2013 |
| JP | 2013256587 A | 12/2013 |
| JP | 2014205823 A | 10/2014 |
| JP | 2016003311 A | 1/2016 |
| JP | 2016084373 A | 5/2016 |
| JP | 6150415 B2 | 6/2017 |
| JP | 2017119848 A | 7/2017 |
| JP | 2018090806 A | 6/2018 |
| JP | 2018111792 A | 7/2018 |
| JP | 2018184574 A | 11/2018 |
| JP | 2019507813 A | 3/2019 |
| JP | 2019117325 A | 7/2019 |
| JP | 2019520438 A | 7/2019 |
| WO | 2012086402 A1 | 6/2012 |
| WO | 2016098305 A1 | 6/2016 |
| WO | 2016167347 A1 | 10/2016 |
| WO | 2018066379 A1 | 4/2018 |
| WO | 2022169556 A1 | 8/2022 |

OTHER PUBLICATIONS

Machine assisted English translation of JP2016003311A obtained from https://patents.google.com/patent on Dec. 4, 2022, 13 pages.
Machine assisted English translation of JP2013139547A obtained from https://patents.google.com/patent on Dec. 4, 2022, 9 pages.
Machine assisted English translation of JP2013256587A obtained from https://patents.google.com/patent on Dec. 4, 2022, 9 pages.
Machine assisted English translation of JP2017119848A obtained from https://patents.google.com/patent on Dec. 4, 2022, 19 pages.
Machine assisted English translation of WO2016167347A1 obtained from https://patents.google.com/patent on Dec. 4, 2022, 18 pages.
Machine assisted English translation of JP2018111792A obtained from https://patents.google.com/patent on Dec. 4, 2022, 13 pages.
Machine assisted English translation of JP2016084373A obtained from https://patents.google.com/patent on Dec. 4, 2022, 11 pages.
Machine assisted English translation of JP2007246894A obtained from https://patents.google.com/patent on Dec. 4, 2022, 10 pages.
Machine assisted English translation of JP2008303343A obtained from https://patents.google.com/patent on Dec. 4, 2022, 13 pages.
Machine assisted English translation of CN110894361A obtained from https://patents.google.com/patent on Dec. 4, 2022, 11 pages.
English translation of International Search Report for PCT/JP2021/006286 dated Apr. 27, 2021, 3 pages.
English translation of International Search Report for PCT/JP2021/006287 dated Apr. 27, 2021, 3 pages.

* cited by examiner

PHOTOCURABLE LIQUID SILICONE COMPOSITION, CURED ARTICLE THEREOF, OPTICAL FILLER CONTAINING SAID COMPOSITION, AND DISPLAY DEVICE CONTAINING LAYER COMPRISING CURED ARTICLE THEREOF

CROSS-REFERENCE TO RELATED APPLICATIONS

This application is the U.S. National Stage of International Application No. PCT/JP2021/006285 filed on 19 Feb. 2021, which claims priority to and all advantages of Japanese Patent Application No. 2020-028126 filed on 21 Feb. 2020, the content of which is incorporated herein by reference.

TECHNICAL FIELD

The present invention relates to a curable liquid silicone composition having, in particular, low viscosity enabling advantageous use in injection molding and a high refractive index and that enables curing using actinic rays, for example, ultraviolet light or an electron beam, a cured product thereof, and applications thereof. The photocurable liquid silicone composition of the present invention has a high refractive index and transparency and is suitable as a material for forming a light transparent layer for electronic and electrical devices and optical devices.

BACKGROUND ART

A wide range of electronic and electrical devices and optical devices using white and ultraviolet LEDs as light sources have been commercialized. As a peripheral material, silicone materials are being actively considered due to the need for high transparency and reliability. As a liquid sealing material that directly seals a light source, liquid silicone compositions with a high refractive index, as disclosed in Patent Document 1, for example, are already in practical use. Furthermore, infrared LED light sources and devices using said sources are also being actively developed in anticipation of large markets for various sensors, monitoring cameras, infrared data communications, and the like. On the other hand, in addition to these conventional LEDs, micro-LED technology, which takes advantage of the high energy efficiency thereof, is being rapidly researched and developed, and is starting to be applied to a variety of applications.

Herein, micro-LEDs and other LEDs that have been under examination in recent years have extremely small light source substrates, which often require peripheral materials to have a small area and thin layers. In this case, an injection molding method, in which a curable composition is injected into a gap between a light source substrate and a transparent substrate and then cured, is considered promising as a technique for forming a sealing layer therebetween. As materials suitable for this processing method, low-viscosity liquid silicone materials that can be photocured and have high transparency after curing are required. Furthermore, materials with a high refractive index are desirable to reduce interfacial reflections and increase light extraction efficiency.

For example, Patent Document 2 proposes a UV curable silicone composition including an organopolysiloxane containing an alkenyl group and a phenyl group, an organosiloxane containing a mercaptoalkyl group bonded to a silicon atom, and a photoinitiator. However, the phenyl group content of the organopolysiloxane for this type of UV curable silicone composition is low (less than 2 mol % of the total substituted groups), so the refractive index is low. Patent Document 3 also proposes a UV curable silicone composition including a straight-chain organopolysiloxane containing an alkenyl group and a phenyl group, an organosiloxane containing a mercaptoalkyl group bonded to a silicon atom, a silane compound containing an aliphatic unsaturated group, and a photoinitiator. However, for this UV curable silicone composition, the phenyl group content in the organopolysiloxane is not sufficiently high (5 to 33 mol % of total substituted groups), so the refractive index is low and furthermore, the composition viscosity is a high 1,800 cP or more and so is not suitable for injection molding.

Furthermore, Patent Document 4 discloses a UV curable silicone composition including a straight-chain organopolysiloxane containing an alkenyl group and a phenyl group, a polyether compound containing an alkenyl group, a compound containing a mercaptoalkyl group, a phosphorus atom-containing photoinitiator, and a hindered phenol compound. However, the phenyl group content in the organopolysiloxane for this UV curable silicone composition is high (47 mol % of total substituted groups) and so the refractive index is high. On the other hand, the composition viscosity is a very high 3,000 mPa·s or more and so is not suitable for injection molding methods. Note that the curable liquid silicone composition disclosed in Patent Document 1 described above is not suitable for an injection molding method because the overall viscosity of the composition at 25° C. is very high at 3,000 mPa·s or more.

In this manner, liquid silicone materials with a low refractive index such as the compound in Patent Document 2 cannot achieve sufficient light extraction efficiency in a device that uses micro LEDs and the like. Furthermore, the overall viscosity is high for the compositions in Patent Documents 1, 3, and 4 so if applied to injection molding, the compositions cannot be injected into minute gaps between members (hereinafter also called "small gap") and therefore, sufficient gap fill properties cannot be achieved. Specifically, even if a curable liquid silicone composition with high viscosity is injected between a light source substrate and a transparent substrate for sealing, injection so as to sufficiently fill the gap between the two is difficult, which may cause process defects and sealing failures, resulting in lower production efficiency and yield, lower quality, and failure of a final displaying device, which is not preferred.

RELATED ART DOCUMENTS

Patent Documents

Patent Document 1: Japanese Unexamined Patent Application 2007-008996 (Japanese Patent No. 5392805)
Patent Document 2: Japanese Unexamined Patent Application No. H11-60953
Patent Document 3: WO 2012-86402
Patent Document 4: Japanese PCT Patent Application 2019-507813

SUMMARY OF THE INVENTION

Problem to be Solved by the Invention

An object of the present invention is to provide: a photocurable liquid silicone composition that has low viscosity that facilitates injection into a small gap, cures quickly by irradiating with a high energy beam such as ultraviolet light, has a refractive index after curing that is high not only in a visible region but also in an infrared region, and is particularly useful as a material for a device using an infrared LED light source; a cured product thereof; and an application thereof.

Means for Solving the Problem

Features of the photocurable liquid silicone composition according to the present invention include:
(A) an organosilane or organopolysiloxane with 1 to 5 silicon atoms, having at least two alkenyl groups with 2 to 12 carbon atoms in a molecule, and at least two monovalent functional groups selected from aromatic groups with 6 to 12 carbon atoms and aralkyl groups with 7 to 12 carbon atoms;
(C) a compound having at least two mercapto groups in the molecule {at an amount where the mercapto groups in component (C) are 0.2 to 3 mols relative to 1 mol of alkenyl groups in component (A)}; and
(D) a photo-radical initiator; wherein
with regards to 100 parts by mass of component (A), component (C), and component (D), the content of component (A) is in a range of 10 to 99 parts by mass and the content of component (D) is 0.01 to 3.0 parts by mass, and the refractive index of the entire liquid composition prior to curing, at 25° C., and at a wavelength of 847 nm is 1.48 or higher.
In addition, the viscosity of the entire liquid composition prior to curing measured at 25° C. using an E-type viscometer is preferably 500 mPa·s or less and more preferably 200 mPa·s or less.

The cured product of the present invention is produced by irradiating and curing the photocurable liquid silicone composition.

The cured product of the present invention preferably has a refractive index at 25° C. and 847 nm of 1.50 or more and in particular is preferably 1.54 or more.

An optical filler of the present invention contains the photocurable liquid silicone composition described above.

A displaying device of the present invention includes a layer containing a cured product of the photocurable liquid silicone composition described above. In particular, the displaying device is preferably a displaying device that uses an infrared LED light source.

Features of a method of manufacturing a displaying device according to the present invention, include:
a step of injecting the photocurable liquid silicone composition described above between a substrate for a light source and a transparent substrate; and
a step of curing the photocurable liquid silicone composition after injection by irradiating with a high energy beam.

Effects of the Invention

The photocurable liquid silicone composition of the present invention has a low viscosity that facilitates injection into a small gap and can cure quickly by irradiating with a high energy beam such as ultraviolet light. Furthermore, the refractive index after curing is high not only in a visible region but also in an infrared region, making the composition useful as a material for a device using an infrared LED light source.

DESCRIPTION OF THE PREFERRED EMBODIMENT

The photocurable liquid silicone composition of the present invention is described below in detail.

Component (A) is one of the characterizing structures of the present composition, a component that lowers viscosity without impairing curability of a curable liquid silicone composition, contains one to five silicon atoms, and includes an organosilane or organopolysiloxane containing at least two alkenyl group having from 2 to 12 carbon atoms and at least two monovalent functional groups selected from aromatic groups with 6 to 12 carbon atoms and aralkyl groups with 7 to 12 carbon atoms in one molecule. Component (A) has low volatility and does not inhibit the photocuring of the composition of the present invention. In addition, component (A) has an aromatic group or aralkyl group in the molecule and so improves the refractive index of the overall composition and the cured product.

In this manner, component (A) is a silane or siloxane oligomer (organopolysiloxane with a siloxane degree of polymerization of 5 or less) having a small molecular weight due to the number of silicon atoms being 5 or less, and has at least two alkenyl groups with 2 to 12 carbon atoms that are involved in a curing reaction in a molecule. Therefore, a crosslinking reaction proceeds with component (C) described below. On the other hand, component (A) has a relatively low molecular weight and low viscosity, yet has low volatility and does not easily inhibit a curing reaction. Therefore, the composition of the present invention containing component (A) exhibits excellent curing reactivity, reduces the viscosity of the entire composition so as to be suitable for injection molding, and significantly improves gap filling properties.

Examples of the alkenyl group in component (A) include vinyl groups, allyl groups, butenyl groups, pentenyl groups, hexenyl groups, heptenyl groups, octenyl groups, nonenyl groups, decenyl groups, undecenyl groups, and dodecenyl groups. From the perspective of economic efficiency and reactivity, vinyl groups, allyl groups, 5-hexenyl groups, and 7-octenyl groups are preferable.

In addition to the alkenyl group, component (A) includes at least two monovalent functional groups selected from aromatic groups with 6 to 12 carbon atoms and aralkyl groups with 7 to 12 carbon atoms. Examples of these functional groups include: aryl groups with 6 to 12 carbon atoms such as phenyl groups, tolyl groups, and xylyl groups and aralkyl groups with 7 to 12 carbon atoms such as benzyl groups and phenethyl groups and from the perspective of economic efficiency, phenyl groups and phenethyl groups are preferable.

On the other hand, examples of other groups bonded to a silicon atom in component (A) (specifically, groups other than monovalent functional groups selected from alkenyl groups, aromatic groups with 6 to 12 carbon atoms, and aralkyl groups with 7 to 12 carbon atoms described above) include methyl groups, ethyl groups, propyl groups, butyl groups, pentyl groups, hexyl groups, heptyl groups, octyl groups, nonyl groups, decyl groups, undecyl groups, dodecyl groups, and other alkyl groups with 1 to 12 carbon atoms; and 3-chloropropyl groups, 3,3,3-trifluoropropyl groups, and other halogen-substituted alkyl groups with 1 to 12 carbon atoms. Methyl groups are preferred from the perspective of economic efficiency and heat resistance. Furthermore, the silicon atom in component (A) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups and the like.

Specific examples of component (A) in the present invention include the following compounds A-1 to A-13.
A-1: Divinyldiphenylsilane
A-2: 1,3-divinyl-1,3-dimethyl-1,3-diphenyldisiloxane
A-3: 1,5-divinyl-3,3-diphenyl-1,1,5,5-tetramethyltrisiloxane
A-4: 1,5-divinyl-1,5-diphenyl-1,3,3,5-tetramethyltrisiloxane
A-5: 1,5-diphenyl-3,3-divinyl-1,1,5,5-tetramethyltrisiloxane
A-6: 1,5-diphenethyl-3,3-divinyl-1,1,5,5-tetramethyltrisiloxane
A-7: 1,7-divinyl-3,3,5,5-tetraphenyl-1,1,7,7-tetramethyltetrasiloxane
A-8: 1,7-divinyl-1,7-diphenyl-1,3,3,5,5,7-hexamethyltetrasiloxane
A-9: 1,7-divinyl-3,3-diphenyl-1,1,5,5,7,7-hexamethyltetrasiloxane
A-10: 1,7-divinyl-3,5-diphenyl-1,1,3,5,7,7-hexamethyltetrasiloxane
A-11: 1,3-divinyl-5,7-diphenyl-1,3,5,7-tetramethylcyclotetrasiloxane
A-12: 1,5-divinyl-3,7-diphenyl-1,3,5,7-tetramethylcyclotetrasiloxane
A-13: Phenyl-tris(dimethylvinylsiloxy)silane The number of silicon atoms in component (A) is 5 or less and is preferably 2 or 3. This can increase the contribution to low viscosity of the curable composition. Specifically, within the compounds described above, the compounds A-2 to A-6 can be preferably used.

Relative to 100 parts by mass of the curable composition, the content of component (A) is 10 to 99 parts by mass, preferably 10 to 80 parts by mass, and more preferably 15 to 75 parts by mass. This is because, if the amount of component (A) is equal to or higher than the lower limit of the aforementioned range, the viscosity of the resulting curable composition can more readily be reduced. On the other hand, if the amount is equal to or lower than the upper limit of the aforementioned range, the mechanical properties of a resulting cured product are enhanced.

Component (B) is an arbitrary configuration of a photo-curable liquid silicone composition of the present invention that is blended as needed, and is an organopolysiloxane having an average number of silicon atoms in a molecule that is greater than 5, having at least one alkenyl group with 2 to 12 carbon atoms, and in which 34% or more of the number of substitution groups on a silicon atom are monovalent functional groups selected from aromatic groups with 6 to 12 carbon atoms and aralkyl groups with 7 to 12 carbon atoms. Such a component (B) contains many aromatic groups or aralkyl groups in a molecule, and therefore efficiently improves the refractive index of the entire composition and cured product thereof. Component (B) also preferably has at least two alkenyl groups with 2 to 12 carbon atoms in a molecule, and in particular, preferably has alkenyl groups with 2 to 12 carbon atoms at both molecular terminals.

Preferable examples of the alkenyl group in component (B) include vinyl groups, allyl groups, butenyl groups, pentenyl groups, hexenyl groups, heptenyl groups, octenyl groups, nonenyl groups, decenyl groups, undecenyl groups, and dodecenyl groups; however, from the perspective of economic efficiency and reactivity, vinyl groups, allyl groups, hexenyl groups, and octenyl groups are preferable. Furthermore, examples of groups bonded to a silicon atom other the alkenyl group in component (B) include: methyl groups, ethyl groups, propyl groups, butyl groups, pentyl groups, hexyl groups, heptyl groups, octyl groups, nonyl groups, decyl groups, undecyl groups, dodecyl groups, and other alkyl groups with 1 to 12 carbon atoms; and 3-chloropropyl groups, 3,3,3-trifluoropropyl groups, and other halogen-substituted alkyl groups with 1 to 12 carbon atoms. Methyl groups are preferable from the perspective of economic efficiency and heat resistance. On the other hand, examples of the monovalent functional group selected from aromatic groups with 6 to 12 carbon atoms and aralkyl groups with 7 to 12 carbon atoms include phenyl groups, tolyl groups, xylyl groups, and other aryl groups with 6 to 12 carbon atoms; and benzyl groups, phenethyl groups, and other aralkyl groups with 7 to 12 carbon atoms. Phenyl groups and phenethyl groups are preferred from the perspective of economic efficiency. The silicon atom in component (B) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups and the like.

The viscosity of component (B) at 25° C. is not limited, but is within a range of 50 to 100,000 mPa·s, and preferably within a range of 100 to 100,000 mPa·s, within a range of 100 to 50,000 mPa·s, or within a range of 100 to 10,000 mPa·s. This is because, if the viscosity of component (B) is equal to or higher than the lower limit of the aforementioned range, the mechanical characteristics of the resulting cured product are improved. On the other hand, if the amount is equal to or lower than the upper limit of the aforementioned range, the viscosity of the resulting curable composition can more readily be reduced.

A preferred aspect of component (B) is a straight chain polysiloxane expressed by the following formula (1).

[Formula 1]

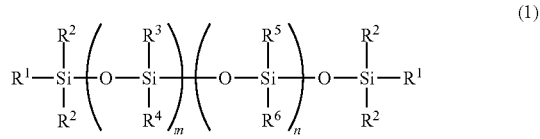

(1)

In the formula, $R^1$ represents the same or different alkenyl groups with 2 to 12 carbon atoms (terminal alkenyl groups), and examples include vinyl groups, allyl groups, butenyl groups, pentenyl groups, hexenyl groups, heptenyl groups, octenyl groups, nonenyl groups, decenyl groups, undecenyl groups, and dodecenyl groups. From the perspective of economic efficiency and reactivity, vinyl groups, allyl groups, 5-hexenyl groups, and 7-octenyl groups are preferable.

$R^2$ and $R^3$ each independently represent unsubstituted or fluorine-substituted monovalent alkyl groups with 1 to 12 carbon atoms, and
examples include methyl groups, ethyl groups, propyl groups, butyl groups, pentyl groups, hexyl groups, heptyl groups, octyl groups, nonyl groups, decyl groups, undecyl groups, dodecyl groups, 3-chloropropyl groups, and 3,3,3-trifluoropropyl groups. Methyl groups are preferable from the perspective of economic efficiency and heat resistance.

$R^4$ each independently represent an unsubstituted or fluorine-substituted monovalent functional group selected from aromatic groups with 6 to 12 carbon atoms and aralkyl groups with 7 to 12 carbon atoms, and examples include phenyl groups, tolyl groups, xylyl groups, benzyl groups, and phenethyl groups. Phenyl groups and phenethyl groups are preferred from the perspective of economic efficiency.

$R^5$ and $R^6$ each independently represent an unsubstituted or fluorine-substituted monovalent alkyl group with 1 to 10 carbon atoms or a monovalent functional group selected from aromatic groups with 6 to 12 carbon atoms and aralkyl groups with 7 to 12 carbon atoms, and examples of each include the same groups mentioned above. Examples include methyl groups, phenyl groups, tolyl groups, xylyl groups, benzyl groups, and phenethyl groups. A group selected from methyl groups, phenyl groups, and phenethyl groups is preferred from the perspective of economic efficiency.

However, in one molecule, 34% or more of substituted groups on silicon atoms, in other words, the number of all $R^1$ to $R^6$ are monovalent functional groups selected from aromatic groups with 6 to 12 carbon atoms and aralkyl groups with 7 to 12 carbon atoms. Furthermore, m and n in the formula are numbers that satisfy $0 \leq m < 1,000$, $0 \leq n < 500$, $3 \leq m+n < 1,500$.

Such a component (B) can be one organopolysiloxane or a mixture of two or more organopolysiloxanes expressed by the following general formulae. Note that in the formula, Me, Vi, and Ph represent a methyl group, vinyl group, and phenyl group, respectively, and a and b are each preferably an integer of 1 or more, where the viscosity at 25° C. is within a range of 50 to 100,000 mPa·s. Herein, the value of a+b is 3 or more, and c is a number of 3 or more, where the viscosity at 25° C. is within a range of 50 to 100,000 mPa·s.

$Me_2ViSiO(Me_2SiO)_a(MePhSiO)_bSiMe_2Vi$ $Me_2ViSiO(Me_2SiO)_a(Ph_2SiO)_bSiMe_2Vi$ $Me_2ViSiO(MePhSiO)_a(Ph_2SiO)_bSiMe_2Vi$ $Me_2ViSiO(MePhSiO)_bSiMe_2Vi$ $Me_2ViSiO(Me(PhCH_2CH_2)SiO)_cSiMe_2Vi$ $Me_2ViSiO(Ph_2SiO)_cSiMe_2Vi$

For the amount of component (B) added, when the total amount of component (A) above and components (C), (D), and (B) described below is 100 parts by mass, the amount of (B) is within a range of 1 to 75 parts by mass, and more preferably within a range of 1 to 70 parts by mass.

Component (C) is a compound having at least two mercapto groups in a molecule that react with the alkenyl groups present in component (A) and optional component (B) when irradiated with light and is the component that cures the present composition. Preferable aspects of component (C) include: (C1) a mercaptoalkyl functional polysiloxane or (C2) an organic compound that is silicon-free while containing a mercapto group. In particular, with the composition according to the present invention, the (C2) organic compound that is silicon-free is preferably used. These components are described hereinafter.

(C1) Mercaptoalkyl Functional Polysiloxane:

Examples of the mercaptoalkyl group in component (C1) include 3-mercaptopropyl groups, 4-mercaptobutyl groups, and 6-mercaptohexyl groups. Furthermore, examples of groups other than mercaptoalkyl groups that are bonded to the silicon atom in component (C1) include: alkyl groups with 1 to 12 carbon atoms such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups with 6 to 12 carbon atoms such as phenyl groups, tolyl groups, xylyl groups, and the like; aralkyl groups with 7 to 12 carbon atoms such as benzyl groups, phenetyl groups, and the like; halogen substituted alkyl groups with 1 to 12 carbon atoms such as 3-chloropropyl groups, 3,3,3-trifluoropropyl groups, and the like; but from the perspective of economics and heat resistance, methyl groups and phenyl groups are preferable. Furthermore, the silicon atom in component (C1) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups and the like.

The viscosity of component (C1) at 25° C. is within a range of 5 to 1,000 mPa·s, preferably within a range of 5 to 500 mPa·s, and more preferably within a range of 10 to 500 mPa·s. This is because if the viscosity of component (C1) is above the lower limit of the range described above, the mechanical properties of the cured product obtained will be enhanced, but on the other hand, if the viscosity is below the upper limit of the range described above, the transparency and coatability of the composition obtained will be enhanced.

Exemplary such components (C1) may include, for example, (C11) a straight-chain organopolysiloxane represented by the general formula:

$R_3SiO(R_2SiO)_nSiR_3$ and/or (C12) a branched chain organopolysiloxane represented by the average unit formula:

$(R_3SiO_{1/2})_a(R_2SiO_{2/2})_b(RSiO_{3/2})_c(SiO_{4/2})_d$.

In the formula, R represents the same or different monovalent organic groups with 1 to 12 carbon atoms that does not have a mercaptoalkyl group or an aliphatic unsaturated bond. Examples of the mercaptoalkyl groups are the same groups as described above. Furthermore, the monovalent hydrocarbon groups that do not have an aliphatic unsaturated bond are the same as described above, and examples include alkyl groups with 1 to 12 carbon atoms, aryl groups with 6 to 12 carbon atoms, aralkyl groups with 7 to 12 carbon atoms, and halogen substituted alkyl groups with 1 to 12 carbon atoms. However, at least two of the R are mercaptoalkyl groups.

Furthermore, n in the formula is an integer of 1 or higher, wherein the viscosity of component (C11) at 25° C. is 5 to 1,000 mPa·s.

Furthermore, in the formula, a, b, c, and d are numbers from 0 to 1, and the total of a, b, c, and d is 1. However, c and d are numbers greater than 0.

Component (C11) can be a mixture of two or more types of organopolysiloxanes expressed by the following general formulas. Note that in the formula, Me, Ph, and Thi represent methyl groups, phenyl groups, and 3-mercaptopropyl groups, respectively; wherein, n1 and n2 represent integers that are 1 or higher such that the viscosity at 25° C. is within a range of 5 to 1,000 mPa·s, and n3 is an integer of 2 or higher such that the viscosity at 25° C. is within a range of 5 to 1,000 mPa·s.

$Me_3SiO(Me_2SiO)_{n1}(MeThiSiO)_{n3}SiMe_3$ $Me_3SiO(MePhSiO)_{n1}(MeThiSiO)_{n3}SiMe_3$ $Me_3SiO(Me_2SiO)_{n1}(Ph_2SiO)_{n2}(MeThiSiO)_{n3}SiMe_3$

Examples of the component (C12) include one type or a mixture of two or more types of an organopolysiloxane as expressed by the following average unit formulas. Note that in the formula, Me, Ph, and Thi represent methyl groups, phenyl groups, and 3-mercaptopropyl groups, respectively; a', b', b", c', and d' represent numbers from 0 to 1 (however 0 is not included), and the total of a', b', b", c', and d' is 1.

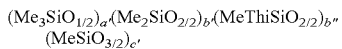

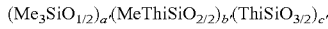

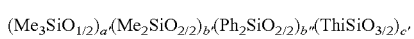

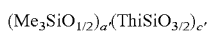

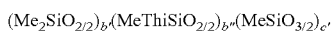

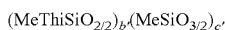

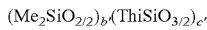

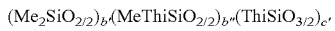

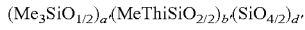

$(Me_3SiO_{1/2})_{a'}(MeThiSiO_{2/2})_{b'}(SiO_{4/2})_{d'}$ (C2) Organic Compound Containing Mercapto Groups and not Containing Silicon Atoms There are no particular restrictions so long as at least two mercapto groups are provided in one molecule, and examples include: trimethylolpropane-tris(3-mercaptopropionate), trimethylolpropane-tris(3-mercaptobutyrate), trimethylolethane-tris(3-mercaptobutyrate), pentaerythritol-tetrakis(3-mercaptopropionate), tetraethylene glylcol-bis(3-mercaptopropionate), dipentaerythritol-hexakis(3-mercaptopropionate), pentaerythritol-tetrakis(3-mercaptobutyrate), 1,4-bis(3-mercaptobutyryloxy) butane, and other ester compounds of mercaptocarboxylic acids and polyhydric alcohols; ethanediol, propane dithiol, hexamethylene dithiol, decamethylene dithiol, 3,6-dioxa-1,8-octane dithiol, 1,4-benzene dithiol, toluene-3,4-dithiol, xylylene dithiol, and other aliphatic or aromatic thiol compounds; 1,3,5-tris[(3-mercaptopropionyloxy)-ethyl]-isocyanurate, and 1,3,5-tris[(3-mercaptobutyryloxy)-ethyl]-isocyanurate; as well as mixtures of two or more types thereof.

The molecular weight of the mercapto containing compound is not particularly restricted, but is preferably within a range of 100 to 2,000, within a range of 100 to 1,500, or within a range of 100 to 1,000. This is because when the molecular weight is higher than the lower limit of the aforementioned range, the volatility of the mercapto containing compound itself is reduced, and problems with odor are reduced, and on the other hand, when the molecular weight is lower than the upper limit of the aforementioned range, solubility with regard to component (A) and component (B) improves.

One of or a mixture of component (C1) and component (C2) described above can be applied as component (C) but from the perspective of efficient design and manufacturing a uniform curable composition, use of component (C2) is preferable.

The content of component (C) is an amount such that the amount of mercapto groups in this component is within a range of 0.2 to 3 mols, preferably a range of 0.5 to 2 mols, or a range of 0.5 to 1.5 mols relative to a total amount of 1 mol of the alkenyl groups in component (A) and the alkenyl groups in optional component (B). This is because, if the content of component (C) is above the lower limit of the aforementioned range, the composition obtained will sufficiently cure; however, if, on the other hand, the content is below the upper limit of the aforementioned range, the mechanical properties of the cured product obtained will be enhanced.

Component (D) is a photoradical initiator that promotes curing of this composition. Examples of component (D) include: an α-hydroxyketone initiator, a benzyl dimethyl ketal initiator, a phosphine oxide initiator, specifically, a 1-hydroxycyclohexylphenylketone (product name Irgacure 184 manufactured by BASF), 2-hydroxy-2-methyl-1-phenylpropanone (product name Darocur 1173 manufactured by BASF), α,α-dimethoxy-α-phenylacetophenone (product name Irgacure 651 manufactured by BASF), diphenyl(2,4,6-trimethylbenzoyl) phosphine oxide (product name Darocur TPO, manufactured by BASF), ethoxyphenyl(2,4,6-trimethylbenzoyl) phosphine oxide (product name Irgacure TPO-L manufactured by BASF), a 50/50 (weight ratio) mixture of diphenyl(2,4,6-trimethylbenzoyl) phosphine oxide and 2-hydroxy-2-methyl-1-phenyl propanone (product name Darocur 4265 manufactured by BASF), phenylbis (2,4,6-trimethylbenzoyl) phosphine oxide (product name Irgacure 819 manufactured by BASF Corporation), and a mixture of ethoxyphenyl(2,4,6-trimethylbenzoyl) phosphine oxide and phenylbis(2,4,6-trimethylbenzoyl) phosphine oxide (product name Irgacure 2100 manufactured by BASF).

The content of component (D) is within a range of 0.01 to 30 parts by mass, preferably within a range of 0.05 to 1.0 parts by mass, and more preferably within a range of 0.05 to 0.5 parts by mass, with regard to a total of 100 parts by mass of component (A) through component (D). This is because if the amount of component (D) is above the lower limit of the range described above, the curing properties of the composition obtained will the favorable; however, if, on the other hand, the amount is below the upper limit of the range described above, the heat resistance and light resistance of the cured product obtained will be favorable.

In the present composition, (E) a hindered phenol compound can be contained to retain favorable storage stability of the present composition and to provide heat resistance to the cured product. Examples of component (E) include 2,6-bis(hydroxymethyl)-p-cresol, 2,6-di-tert-butyl-4-methylphenol, 2,6-di-tert-butyl-4-hydroxymethylphenol, pentaerythritol tetrakis[3-(3,5-di-tert-butyl-4-hydroxyphenyl) propionate], thiodiethylene bis[3-(3,5-di-tert-butyl-4-hydroxyphenyl) propionate], octadecyl-3-(3,5-di-tert-butyl-4-hydroxyphenyl) propionate, 2,4-dimethyl-6-(1-methylpentadecyl) phenol, diethyl[{3,5-bis(1,1-di-tert-butyl-4-hydroxy phenyl)methyl}phosphonate, 3,3',3",5,5',5"-hexane-tert-butyl-4-a,a',a'"-(mesitylene-2,4,6-tolyl)tri-p-cresol, 4,6-bis(octylthiomethyl)-o-cresol, ethylenebis (oxyethylene)bis[3-(5-tert-butyl-4-hydroxy-m-tolyl) propionate], hexamethylenebis[3-(3,5-di-tert-butyl-4-hydroxyphenyl) propionate].

The amount of component (E) is within a range of 0 to 1 parts by mass, preferably within a range of 0.01 to 1 parts by mass, and more preferably within a range of 0.01 to 0.5 parts by mass, with regard to a total of 100 parts by mass of the curable composition. This is because if the amount of component (E) is above the lower limit of the range described above, the storage stability of the composition obtained will be favorable; however, if, on the other hand, the amount is below the upper limit of the range described above, the heat resistance and light resistance of the cured product obtained will be favorable.

Furthermore, in order to reduce the cross-linking density of the obtained cured product, thereby enhancing the mechanical properties and pressure-sensitive adhesion, the present composition may contain (F) an organic compound having one aliphatic unsaturated bond and not having a siloxane bond, in one molecule. Component (F) is preferably an organic compound demonstrating favorable solubility with component (A) to component (D), along with favorable storage stability and therefore a boiling point of 200° C. or higher at 1 atm., for example. Examples of component (F) include: straight chain aliphatic olefins such as dodecene, tetradecene, hexadecene, octadecene, and the like; cyclic aliphatic olefins such as 4-phenyl-1-cyclohexene, and the like; and unsaturated alcohols such as 9-decene-1-ol, oleyl alcohol, terpen-4-ol, and the like.

The amount of compound (F) is not limited, but as the curability of the present composition is favorable and the mechanical properties of a resulting cured product are favorable, the amount is preferably within a range of 0 to 10 parts by mass or within a range of 0 to 5 parts by mass, relative to a total of 100 parts by mass of the curable composition.

Furthermore, the present composition can contain a branched organopolysiloxane containing a siloxane unit expressed by the formula: $R^7SiO_{3/2}$ and/or a siloxane unit expressed by the formula: $SiO_2$, having a monovalent functional group selected from aromatic groups with 6 to 12 carbon atoms and aralkyl groups with 7 to 12 carbon atoms, and does not contain a mercaptoalkyl group, to the extent the object of the present invention is not impaired. In the formula, $R^7$ represents an alkyl group with 1 to 12 carbon atoms, an alkenyl group with 2 to 12 carbon atoms, a hydroxyl group, or an alkoxy group with 1 to 6 carbon atoms. Examples of the alkyl group include methyl groups, ethyl groups, propyl groups, butyl groups, pentyl groups, hexyl groups, heptyl groups, octyl groups, nonyl groups, decyl groups, undecyl groups, and dodecyl groups. Furthermore, examples of the alkenyl group include vinyl groups, allyl groups, butenyl groups, pentenyl groups, hexenyl groups, heptenyl groups, octenyl groups, nonenyl groups, decenyl groups, undecenyl groups, and dodecenyl groups. Furthermore, examples of the alkoxy group include methoxy groups, ethoxy groups, propoxy groups, and butoxy groups. Note that when the siloxane unit expressed by the formula: $R^7SiO_{3/2}$ does not have an alkenyl group, a siloxane unit expressed by $R^8_3SiO_{1/2}$ and/or a siloxane unit expressed by the formula: $R^8_2SiO_{2/2}$ is preferably provided as another siloxane unit. Note that in the formula, $R^8$ represents an alkyl group with 1 to 12 carbon atoms, an alkenyl group with 2 to 12 carbon atoms, a hydroxyl group, or an alkoxy group with 1 to 6 carbon atoms. Examples thereof are the same as the groups described above. However, at least one $R^8$ in a molecule is the alkenyl group.

Examples of the component (G) include one type or a mixture of two or more types of an organopolysiloxane as expressed by the following average unit formulas. Note that in the formulae, Me, Vi, and Ph represent methyl groups, vinyl groups, and phenyl groups, respectively, i, i', j, k, and l each represent a number from 0 to 1 that expresses the ratio of component units (however, 0 is not included), and the sum of i, i', j, k, and l is 1.

$(Me_3SiO_{1/2})_i(Me_2ViSiO_{1/2})_{i'}(PhSiO_{3/2})_k$

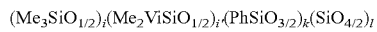

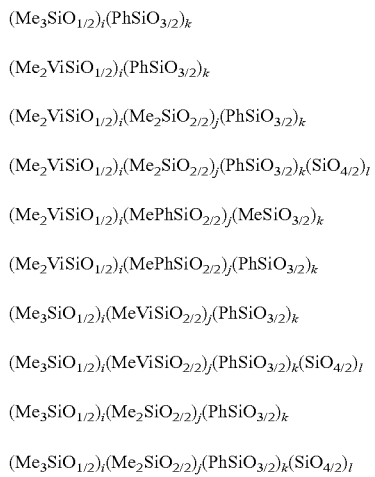

The amount of component (G) is not limited and is within a range of 0 to 20 parts by mass, preferably within a range of 0 to 10 parts by mass, and more preferably within a range of 0 to 5 parts by mass, with regard to a total of 100 parts by mass of the curable composition. This is because when the amount of component (G) is at or above the upper limit of the range above, the viscosity of the resulting curable composition increases.

Other Additives

In addition to the aforementioned components, an additional additive may be added to the composition of the present invention if desired. Examples of additives include, but are not limited to, those described below.

[Adhesion Imparting Agent]

An adhesion promoter can be added to the composition of the present invention to improve adhesion and close fitting properties to a substrate in contact with the composition. When the curable composition of the present invention is used for applications such as coating agents, sealing materials, and the like that require adhesion or close fitting properties to a substrate, an adhesion imparting agent is preferably added to the curable composition of the present invention. An arbitrary known adhesion promoter can be used, so long as the adhesion promoter does not interfere with a curing reaction of the composition of the present invention.

Examples of such adhesion promoters that can be used in the propyl include: organosilanes having a trialkoxysiloxy group (such as a trimethoxysiloxy group or a triethoxysiloxy group) or a trialkoxysilylalkyl group (such as a trimethoxysilylethyl group or triethoxysilylethyl groups) and a hydrosilyl group or an alkenyl group (such as a vinyl group or an allyl group), or organosiloxane oligomers having a linear structure, branched structure, or cyclic structure with approximately 4 to 20 silicon atoms; organosilanes having a trialkoxysiloxy group or a trialkoxysilylalkyl group and a methacryloxyalkyl group (such as a 3-methacryloxypropyl group), or organosiloxane oligomers having a linear structure, branched structure, or cyclic structure with approximately 4 to 20 silicon atoms; organosilanes having a trialkoxysiloxy group or a trialkoxysilylalkyl group and an epoxy group-bonded alkyl group (such as a 3-glycidoxypropyl group, a 4-glycidoxybutyl group, a 2-(3,4-epoxycyclohexyl)ethyl group, or a 3-(3,4-epoxycyclohexyl)propyl group), or organosiloxane oligomers having a linear structure, branched structure, or cyclic structure with approximately 4 to 20 silicon atoms; organic compounds having two or more trialkoxysilyl groups (such as trimethylsilyl groups or triethoxysilyl groups); reaction products of aminoalkyltrialkoxysilane and epoxy group-bonded alkyltrialkoxysilane, and epoxide group-containing ethyl polysilicate. Specific examples thereof include vinyl trimethoxysilane, allyl trimethoxysilane, allyl triethoxysilane, hydrogen triethoxysilane, 3-glycidoxypropyl trimethoxysilane, 3-glycidoxypropyl triethoxysilane, 2-(3,4-epoxycyclohexyl)ethyl trimethoxysilane, 3-methacryloxypropyl trimethoxysilane, 3-methacryloxypropyl triethoxysilane, 1,6-bis(trimethoxysilyl)hexane, 1,6-bis(triethoxysilyl)hexane, 1,3-bis[2-(trimethoxysilyl)ethyl]-1,1,3,3-tetramethyldisiloxane, reaction products of 3-glycidoxypropyl triethoxysilane and 3-aminopropyl triethoxysilane, condensation reaction products of a methylvinyl siloxane oligomer blocked with a silanol group and a 3-glycidoxypropyl trimethoxysilane, condensation reaction products of a methylvinyl siloxane oligomer blocked with a silanol group and a 3-methacryloxypropyl triethoxysilane, and tris(3-trimethoxysilylpropyl)isocyanurate.

The amount of the adhesion promoter added to the curable composition of the present invention is not particularly limited, and is preferably within a range of 0 to 5 parts by mass, or within a range of 0 to 2 parts by mass, relative to a total of 100 parts by mass of components (A), (C), and (D) due to not promoting curing properties of the curable composition and discoloration of a cured product.

[Other Additives]

Another additive may be added to the composition of the present invention in addition to or in place of the adhesion imparting agent described above, if desired. Examples of additives that can be used include leveling agents, silane coupling agents not included in those listed above as adhesion imparting agents, UV absorbers, antioxidants, polymerization inhibitors, fillers (reinforcing fillers, insulating fillers, thermal conductive fillers, and other functional fillers), and the like. If necessary, an appropriate additive can be added to the composition of the present invention. Furthermore, a thixotropy imparting agent may also be added to the composition of the present invention if necessary, particularly when used as a potting agent or sealing agent.

The refractive index of the curable composition of the present invention is a value at 25° C. and a wavelength of 847 nm of the entire liquid composition before curing that is 1.48 or higher. The value of the refractive index under these conditions is preferably 1.50 or higher, and more preferably 1.52 or higher. This property allows the refractive index of a cured product obtained by curing the present composition to be sufficiently high to reduce interfacial reflection between optical glass and another light-transmissive layer in various devices using an infrared LED as a light source, thereby improving light extraction efficiency.

The viscosity of the curable composition is not in particular limited but to enable applicability to injection molding methods, the value measured using an E-type viscometer at 25° C. is 500 mPa·s or less, preferably 10 to 200 mPa·s, and more preferably 10 to 100 mPa·s. This is because if the viscosity of the present composition is greater than or equal to the lower limit of the range described above, the mechanical characteristics of the cured product obtained will be favorable. On the other hand, if less than or equal to the upper limit of the range described above, injection molding of the composition obtained will be feasible.

The present composition can be prepared by uniformly mixing components (A), (C), and (D), and if necessary, another arbitrary component including component (B). When preparing the present composition, mixing can be performed at room temperature using various types of stirrers or kneaders, and if necessary, mixing can be performed while heating. Furthermore, the order of combining the various components is not restricted, and mixing can be performed in any order. On the other hand, preparation of the present composition is recommended to be in a location where there is no contamination of light at or below 450 nm or in a location with as little of the light described above as possible to avoid the effect on curing during preparation.

The present composition can be cured by light irradiation. Examples of the light used for curing the present composition include ultraviolet light and visible light; however, a high energy beam such as ultraviolet light is preferable. Here the wavelength of the light beam is preferably in the range of 250 to 450 nm and more preferably ultraviolet light of 400 nm or less.

A cured product obtained by curing the present composition has a high refractive index, and the refractive index of the cured product is preferably 1.50 or higher at 25° C. and a wavelength of 847 nm. The value of the refractive index of the cured product under these conditions is preferably 1.52 or higher, and more preferably 1.54 or higher. This property allows the refractive index of a cured product obtained by curing the present composition to be sufficiently high to reduce interfacial reflection between optical glass and another light-transmissive layer in various devices using an infrared LED as a light source, thereby improving light extraction efficiency.

The present composition is useful as various types of impregnating agents, potting agents, sealing agents, and adhesives, and is particularly useful as optical fillers for forming a light-transmissive layer for various devices using an infrared LED, and particularly for displaying devices. The cured product is suitable as a light-transmissive layer for displaying devices using an infrared LED due to being less susceptible to coloration and becoming cloudy under high temperature or high temperature and humidity.

The present composition cures at room temperature, and therefore can be suitably applied in coating a substrate with inferior heat resistance. The substrate is generally a transparent substrate such as glass, synthetic resin film, sheet, coating film, or the like. Furthermore, injection molding is an example of a coating method for the present composition, utilizing the low viscosity properties thereof.

Next, the cured product of the present invention will be described in detail. The cured product of the present invention is produced by irradiating and curing the photocurable liquid silicone composition. While the shape of the cured product is not particularly limited, examples thereof include sheets, films, tapes, and lumps. Furthermore, integrating with various types of substrates is also possible.

The forming method of the cured product can be a method of applying the composition to a film shaped substrate, tape shaped substrate, or sheet shaped substrate, then curing by irradiating light forming a cured film composed of the cured product on the surface of the substrate. In addition, the present composition can be injected between two types of base materials where at least one type is a transparent base material enabling irradiating with light through the transparent base material and providing a cured product integrated with the base material. The film thickness of the cured film is not limited, but is preferably 1 to 3,000 μm, and more preferably 10 to 2,000 μm.

A displaying device of the present invention is prepared using the curable liquid silicone composition of the present invention. Examples thereof include LCDs (liquid crystal display), ECDs (electrochromic display), and other light receiving displaying devices, and ELDs (electroluminescent display) and other light emitting displaying devices. In the displaying device of the present invention, a space between a display part such as liquid crystal, organic EL, or the like and a display forming member such as a touch panel, cover lens, or the like, or between display forming members can be filled with the curable liquid silicone composition of the present invention to reduce interfacial reflection and improve light extraction efficiency.

A typical manufacturing method for the displaying device of the present invention is an injection molding method, utilizing the low viscosity properties of the curable liquid silicone composition. A specific example is a method of manufacturing a displaying device by injecting the present composition into a narrow gap between a substrate for an infrared LED light source and various transparent substrates, and then curing by irradiating with ultraviolet light.

The present invention is further described below based on Examples, but the present invention is not limited to the Examples below.

EXAMPLES

The photocurable liquid silicone composition and cured product thereof of the present invention is described below in further detail using examples. Note that in the formulae, Me, Ph, and Vi represent methyl groups, phenyl groups, and vinyl groups, respectively. Furthermore, in the examples, measurements and evaluations were carried out as described below.

[Viscosity of Photocurable Liquid Silicone Composition and Various Components]

The viscosity (mPa·s) at 25° C. of the photocurable liquid silicone composition and various components was measured using an E type viscometer VISCONIC EMD manufactured by TOKIMEC CORPORATION.

[Chemical Structure of Organopolysiloxane]

The chemical structure of the organopolysiloxane was identified by analysis using nuclear magnetic resonance spectroscopy.

[Appearance of Photocurable Liquid Silicone Composition and Cured Product]

The appearance of the photocurable liquid silicone composition and cured product was visually observed and evaluated as described below.
 A: Transparent
 B: Slightly cloudy

[Transparency and Haze of Cured Product]

The photocurable liquid silicone composition was filled between two glass sheets such that the thickness after curing was 200 μm (fill area: 40×40 mm²), after which LED light with a wavelength of 405 nm was irradiated at an intensity of 50 mW/cm² for 40 seconds. The total light transmittance and haze of the cured sheet produced between two glass sheets were measured by a SH7000 haze meter manufactured by NIPPON DENSHOKU INDUSTRIES Co., Ltd. in accordance with JIS K7361-1.

Hardness of Cured Product

The photocurable liquid silicone composition was placed in a glass cup with a diameter of 25 mm and depth of 10 mm and was irradiated in a nitrogen atmosphere with a 405 nm LED light having illuminance of 50 mW/cm² for 40 seconds. The penetration of the cured product was measured at room temperature using a needle penetration tester in accordance with JIS K2207. For those with higher hardness, measurement was performed using a Type A durometer or 00 type durometer in accordance with ASTM D2240.

[Refractive Index of the Cured Product]

Using the curable composition and a cured product prepared for hardness measurement as described above, the refractive index at a wavelength of 847 nm was measured with a Metricon model 2010/M prism coupler at room temperature.

Examples 1 to 7 and Comparative Example 1

Solvent-free photocurable liquid silicone compositions were prepared using the following components. At the time of preparation, components (D), (E), and (H) were pre-mixed to achieve a catalyst solution. The catalyst solution, component (A), component (B), and component (C) were mixed at room temperature using a revolving/rotating mixer to form a curable composition. The mixing ratios (parts by mass) of the components and the properties of the curable composition and cured product are summarized in Table 1.

The following compounds were used as component (A).
 (A1): 1,3-divinyl-1,3-dimethyl-1,3-diphenyldisiloxane
 (A2): 1,5-divinyl-3,3-diphenyl-1,1,5,5-tetramethyltrisiloxane The following organopolysiloxane was used as component (B).

Polymethylphenylsiloxane having a viscosity at 25° C. of 3,000 mPa·s and capped at both molecular terminals with dimethylvinylsiloxy groups, expressed by the following formula:

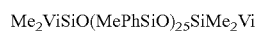

Me$_2$ViSiO(MePhSiO)$_{25}$SiMe$_2$Vi

The following compound was used as component (C).
 (C1): Pentaerythritol-tetrakis(3-mercaptobutyrate)
 (C2): 3,6-dioxa-1,8-octanedithiol The following compound was used as component (D).
Ethoxyphenyl(2,4,6-trimethylbenzoyl) phosphine oxide The following compound was used as component (E).
2,6-ditert-butyl-4-methylphenol The following compounds were used as other component (H).
1,3,5,7-tetramethyl-1,3,5,7-tetravinylcyclotetrasiloxane

TABLE 1

|  | Example 1 | Example 2 | Example 3 | Example 4 | Example 5 | Example 6 | Example 7 | Comparative Example 1 |
|---|---|---|---|---|---|---|---|---|
| (A1) | 22.35 | 25.62 | 31.84 | 67.27 | 46.24 | 46.00 |  |  |
| (A2) |  |  |  |  |  |  | 46.10 |  |
| (B) | 63.58 | 59.13 | 50.45 | 0.00 | 30.09 | 20.00 | 30.00 | 95.48 |
| (C1) | 9.10 | 9.86 | 11.44 | 21.49 | 15.45 | 33.50 | 15.60 | 2.69 |
| (C2) | 4.47 | 4.93 | 5.77 | 10.74 | 7.72 | 0.00 | 7.80 | 1.34 |
| (D) | 0.22 | 0.22 | 0.22 | 0.22 | 0.22 | 0.22 | 0.22 | 0.22 |
| (E) | 0.14 | 0.14 | 0.14 | 0.14 | 0.14 | 0.14 | 0.14 | 0.14 |
| (H) | 0.14 | 0.14 | 0.14 | 0.14 | 0.14 | 0.14 | 0.14 | 0.14 |
| Total | 100.00 | 100.00 | 100.00 | 100.00 | 100.00 | 100.00 | 100.00 | 100.00 |
| [(C1) + (C2)]/ [(A1) + (A2) + (B)]* | 0.64 | 0.63 | 0.63 | 0.63 | 0.63 | 0.80 | 0.80 | 0.63 |

TABLE 1-continued

|  | Example 1 | Example 2 | Example 3 | Example 4 | Example 5 | Example 6 | Example 7 | Comparative Example 1 |
|---|---|---|---|---|---|---|---|---|
| Appearance of curable composition | A | A | A | A | A | A | B | A |
| Viscosity of curable composition | 165 | 129 | 81 | 9 | 32 | 52 | 54 | 1,920 |
| Refractive index of curable composition | 1.53 | 1.53 | 1.52 | 1.52 | 1.52 | 1.52 | 1.51 | 1.53 |
| Appearance of cured product | A | A | A | A | A | A | A | A |
| Refractive index of cured product | 1.54 | 1.54 | 1.54 | 1.55 | 1.54 | 1.55 | 1.53 | 1.54 |
| Transmittance of cured product | >99.5 | >99.5 | >99.5 | >99.5 | >99.5 | >99.5 | 98.5 | >99.5 |
| Haze of cured product | <0.1 | <0.1 | <0.1 | <0.1 | <0.1 | <0.1 | 0.5 | <0.1 |
| Hardness (penetration) of cured product | 49 | 55 | 45 | >80 | 72 |  |  | 42 |
| Hardness (Type A hardness) of cured product |  |  |  |  |  | 42 |  |  |
| Hardness of cured product (Type 00 hardness) |  |  |  |  |  |  | 39 |  |

*The number of mols of mercapto groups in components (C1) and (C2) per 1 mol of the total amount of vinyl groups in components (A1), (A2), and (B)

From the results of Examples 1 to 7, the photocurable liquid silicone composition of the present invention has very low viscosity and favorable transparency. The transparency of the cured product obtained after curing was also confirmed to be high, and the refractive index, particularly in the infrared region, was also confirmed to be high. It was also demonstrated that the hardness of the cured product can be adjusted over a wide range by appropriately changing the components used and amount thereof. On the other hand, from the results of Comparative Example 1, the photocurable liquid silicone composition not containing component (A) was confirmed to have very high viscosity.

INDUSTRIAL APPLICABILITY

The photocurable liquid silicone composition of the present invention has very low viscosity at room temperature and is suitable for injection molding. In addition, the composition readily cures based on irradiation of long wavelength light, for example, visible light with a wavelength of 405 nm or ultraviolet light and so contributes to improved productivity. Furthermore, a resulting cured product has excellent transparency and a high refractive index, particularly in the infrared region (1.50 or higher), making the product useful as a material for devices using an infrared LED light source.

The invention claimed is:

1. A photocurable liquid silicone composition, comprising:
   (A) an organosilane or organopolysiloxane with 1 to 5 silicon atoms, having at least two alkenyl groups with 2 to 12 carbon atoms in a molecule, and at least two monovalent functional groups selected from aromatic groups with 6 to 12 carbon atoms and aralkyl groups with 7 to 12 carbon atoms;
   (C) a compound having at least two mercapto groups in the molecule, present in an amount where the mercapto groups in component (C) are 0.2 to 3 mols relative to 1 mol of alkenyl groups in component (A); and
   (D) a photo-radical initiator;
   wherein with regards to 100 parts by mass of component (A), component (C), and component (D), the content of component (A) is in a range of 10 to 99 parts by mass and the content of component (D) is 0.01 to 3.0 parts by mass, and the refractive index of the entire liquid composition prior to curing, at 25° C. and at a wavelength of 847 nm, is 1.48 or higher.

2. The photocurable liquid silicone composition according to claim 1, wherein the viscosity of the entire liquid composition prior to curing, measured at 25° C. using an E-type viscometer, is 500 mPa·s or less.

3. The photocurable liquid silicone composition according to claim 1, wherein component (A) is an organopolysiloxane with two or three silicon atoms and includes at least two aromatic groups with 6 to 12 carbon atoms in the molecule.

4. The photocurable liquid silicone composition according to claim 1, further comprising:
   (B) an organopolysiloxane having an average number of silicon atoms in a molecule that is greater than 5, having at least one alkenyl group with 2 to 12 carbon atoms, and in which 34% or more of the number of substitution groups on a silicon atom are monovalent functional groups selected from aromatic groups with 6 to 12 carbon atoms and aralkyl groups with 7 to 12 carbon atoms;
   wherein when the total amount of components (A), (C), (D) and (B) is 100 parts by mass, the amount of component (B) is within a range of 1 to 75 parts by mass.

5. The photocurable liquid silicone composition according to claim 4, wherein component (B) is a straight chain polysiloxane expressed by the following formula:

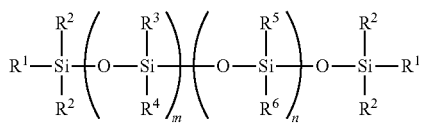

where
- $R^1$ represents an alkenyl group with 2 to 12 carbon atoms;
- $R^2$ and $R^3$ each independently represent an unsubstituted or fluorine-substituted monovalent alkyl group with 1 to 10 carbon atoms;
- $R^4$ independently represents an unsubstituted or fluorine-substituted monovalent functional group selected from aromatic groups with 6 to 12 carbon atoms and aralkyl groups with 7 to 12 carbon atoms;
- $R^5$ and $R^6$ each independently represent an unsubstituted or fluorine-substituted monovalent alkyl group with 1 to 10 carbon atoms or a monovalent functional group selected from aromatic groups with 6 to 12 carbon atoms and aralkyl groups having 7 to 12 carbon atoms;
- m and n satisfy the relationships of $0 \leq m < 1{,}000$, $0 \leq n < 500$, $3 \leq (m+n) < 1{,}500$; and
- at least 34 mol % of the total number of $R^1$ to $R^6$ are monovalent functional groups selected from aromatic groups with 6 to 12 carbon atoms and aralkyl groups with 7 to 12 carbon atoms.

6. The photocurable liquid silicone composition according to claim 1, wherein component (C) is a silicon-free compound.

7. The photocurable liquid silicone composition according to claim 1, wherein the refractive index, at 25° C. and wavelength of 847 nm, is 1.52 or higher.

8. A cured product produced by irradiating and curing the photocurable liquid silicone composition according to claim 1.

9. The cured product according to claim 8, wherein the refractive index, at 25° C. and wavelength of 847 nm, is 1.50 or more.

10. An optical filler, comprising the photocurable liquid silicone composition according to claim 1.

11. A displaying device, comprising a layer containing a cured product of the photocurable liquid silicone composition according to claim 1.

12. A method of manufacturing a displaying device, the method comprising:
- injecting the photocurable liquid silicone composition according to claim 1 between a substrate for a light source and a transparent substrate; and
- curing the photocurable liquid silicone composition after injection by irradiating with a high energy beam.

* * * * *